(12) United States Patent
Tuerk

(10) Patent No.: US 10,273,705 B2
(45) Date of Patent: *Apr. 30, 2019

(54) STEEL TOWER FOR A WIND TURBINE AND A METHOD FOR PRODUCING THE TOWER

(71) Applicant: Nordex Energy GmbH, Hamburg (DE)

(72) Inventor: Ibrahim Tuerk, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,523

(22) Filed: Dec. 22, 2017

(65) Prior Publication Data

US 2018/0179777 A1 Jun. 28, 2018

(30) Foreign Application Priority Data

Dec. 22, 2016 (EP) .................................... 16206090

(51) Int. Cl.
  *E04H 12/00* (2006.01)
  *E04H 12/08* (2006.01)
  (Continued)

(52) U.S. Cl.
  CPC ........... *E04H 12/085* (2013.01); *E04H 12/34* (2013.01); *F03D 13/10* (2016.05); *F03D 13/20* (2016.05); *B23D 45/12* (2013.01); *F05B 2230/50* (2013.01); *F05B 2230/60* (2013.01); *F05B 2230/604* (2013.01); *F05B 2230/61* (2013.01); *F05B 2240/40* (2013.01);
  (Continued)

(58) Field of Classification Search
  CPC ....... E04H 12/085; E04H 12/34; F03D 13/20; F03D 13/10; F05B 2230/60

USPC .................................................... 52/40, 223.5
See application file for complete search history.

(56) References Cited

U.S. PATENT DOCUMENTS 8,209,913 B2 * 7/2012 Murata .................... E04H 12/08
  52/40
8,590,276 B2 * 11/2013 Kryger .................. E04H 12/085
  52/845
(Continued)

FOREIGN PATENT DOCUMENTS

DE 20321855 U1 6/2011
EP 2824257 A1 1/2015
(Continued)

*Primary Examiner* — Basil S Katcheves
(74) *Attorney, Agent, or Firm* — Walter Ottesen, P.A.

(57) ABSTRACT

A steel tower for a wind turbine, including a plurality of cylindrical and/or conical tower sections arranged one above another in a tower lengthwise direction which are joined together via horizontally running annular flanges, at least one tower section having at least two section pieces, which are welded together along their adjacent, horizontal and annular end faces and are welded to a horizontal annular flange along each of the free uppermost and lowermost end face, and the at least one tower section being divided into a plurality of section segments which are joined together by longitudinal profiles and connecting means to form a circumferential tower section. At least one of the annular flanges has at least two separation sections in which the annular flange is divided into annular flange segments. The at least one annular flange forms a monolithic annular flange prior to a severing of the section segments.

19 Claims, 10 Drawing Sheets

(51) Int. Cl.
*F03D 13/20* (2016.01)
*F03D 13/10* (2016.01)
*E04H 12/34* (2006.01)
*B23D 45/12* (2006.01)

(52) U.S. Cl.
CPC ... *F05B 2240/912* (2013.01); *F05B 2260/301* (2013.01); *Y02E 10/728* (2013.01); *Y02P 70/523* (2015.11)

(56) References Cited

U.S. PATENT DOCUMENTS

| | | | |
|---|---|---|---|
| 8,826,614 B2* | 9/2014 | Garcia Maestre | E04H 12/085 52/223.5 |
| 9,091,095 B2* | 7/2015 | Bogl | E04H 12/08 |
| 9,091,098 B2* | 7/2015 | Andresen | E04H 12/08 |
| 9,249,597 B2* | 2/2016 | Stiesdal | E04H 12/34 |
| 2008/0256892 A1 | 10/2008 | Franke | |
| 2010/0071301 A1* | 3/2010 | Herrius de Roest | E04H 12/185 52/651.07 |
| 2013/0081350 A1 | 4/2013 | Boegl et al. | |
| 2017/0122292 A1 | 5/2017 | Michel | |

FOREIGN PATENT DOCUMENTS

| | | | |
|---|---|---|---|
| WO | 2014086170 A1 | 6/2014 | |
| WO | 2015158349 A1 | 10/2015 | |

* cited by examiner

STEEL TOWER FOR A WIND TURBINE AND A METHOD FOR PRODUCING THE TOWER

CROSS REFERENCE TO RELATED APPLICATION

This application claims priority of European patent application no. 16 206 090.9, filed Dec. 22, 2016, the entire content of which is incorporated herein by reference.

FIELD OF THE INVENTION

The invention relates to steel towers for wind turbines, including a plurality of tower sections arranged one above another and joined together, of which at least one tower section includes section segments. The invention likewise relates to a method for producing steel towers of this kind.

BACKGROUND OF THE INVENTION

With the increasing demand for wind turbines of higher power and thus larger dimensions of the main components, such as tower, nacelle, and rotor blades, the permissible limits for vehicle dimensions have been reached, especially the maximum height of 4 meters. The boundaries dictated by the logistical infrastructure, such as clear height under bridges, also make it necessary to divide tower sections with more than roughly 4 meters diameter into several pieces.

The utility model DE 203 21 855 U1 describes a steel tower for a wind turbine including a number of cylindrical or conical tower sections, where at least its broader sections are subdivided into two or more elongated shell segments which are combined into a complete tower section via vertical flanges, which are fastened to each other by a plurality of bolts, the shells also being provided with upper and lower horizontal flanges in order to allow the tower sections to be connected to each other.

US 2008/0256892 shows a wind turbine tower with a load-bearing outer tower wall, having an encircling, outer boundary surface and consisting of a plurality of wall sections, each of which has a middle section and two edge sections running in the longitudinal direction of the tower, being provided with a plurality of connection boreholes, while the surfaces defined by the edge sections run along the outer boundary surface or at a constant distance from it, and the connection boreholes are oriented transversely to the outer boundary surface.

From US 2013/0081350 there is known a tower with an adapter piece as well as a method of making a tower, wherein a lower tubular tower section of concrete and an upper tubular tower section of steel are provided. Such hybrid towers are preferred at present for the erecting of especially tall wind turbine towers, since large diameters are possible with the lower concrete structure and conventional wind turbine towers can be set atop the lower tower structure in order to achieve greater heights and thus better wind utilization.

From US 2017/0122292 there is known a method for making a tower section for the tower of a wind turbine in which the tower section is subdivided into section segments in the tower lengthwise direction. The section segments are at first created by severing the tower wall and afterwards joined to each other once more with the aid of flanges.

SUMMARY OF THE INVENTION

It is an object of the invention to provide a steel tower for a wind turbine as well as a method for producing same, making it possible to precisely produce the steel tower from segmented tower sections with simple means.

The object can, for example, be achieved via a steel tower for a wind turbine, the steel tower defining a longitudinal tower direction. The steel tower includes: a plurality of annular flanges configured to run horizontally; a plurality of tower sections arranged one above another and joined together via the annular flanges; each of the tower sections being either conical or cylindrical; at least one of the tower sections including at least two section pieces; the at least two section pieces being welded together along their adjacent, horizontal and annular end faces and being welded in each case to one of the horizontal annular flanges along a free uppermost and a lowermost end face; the at least one tower section being divided into a plurality of section segments which are joined together by longitudinal profiles and connectors so as to form an encircling tower section; at least one of the annular flanges having at least two separation areas or sections in which the annular flange is divided into annular flange segments; and, the at least one of the annular flanges being configured to form a monolithic annular flange prior to a severing of the section segments.

The steel tower for a wind turbine includes a plurality of cylindrical and/or conical tower sections which are joined together via horizontal annular flanges, at least one tower section having at least two section pieces, which are welded together along their horizontal annular end faces and are welded to horizontal annular flanges along the free uppermost and lowermost end face. At least one tower section is divided into a plurality of elongate section segments, preferably into three section segments, which are joined to one another via vertical longitudinal profiles and connecting means, preferably screw connections, to form a complete tower section. The annular flanges are divided at predetermined positions into at least two, preferably into three annular flange segments; for this purpose, separation sections are provided at the predetermined position. The annular flanges are separated at the separation sections into annular flange segments together with the tower section being separated into section segments. The separation section is distinguished by having a lower material thickness than the rest of the annular flange. The problem on which the invention is based is solved in that at least one tower section is divided into a plurality of section segments, in the same manner as the annular flange, wherein the annular flange is separated in the region of its separation sections. However, the tower sections are not limited here to two or three section segments or annular flange segments; on the contrary, tower sections which have four or more section segments and annular flange segments are also included.

The object can, for example, further be achieved via a method for making a steel tower for a wind turbine. The method includes the steps of: making a section segment for a tower section, wherein first of all steel sheet is bent annularly and is welded along a longitudinal edge to form a close section segment; welding a plurality of section segments along their end faces running in the circumferential direction to form a tubular body; aligning a circumferential annular flange on at least one of a section segment, which is not yet welded to the tubular body, and one of the end faces of the tubular body; welding on the aligned annular flange so as to form the tower section, wherein the annular flange has, at predetermined positions, a separation section in each case with a reduced cross section, and the separation sections each coincide with a planned separation line; and, severing the tower section including the annular flange along the separation line into section segments and subsequently connecting the severed section segments to form the tower section of the steel tower.

The method serves for producing a steel tower for a wind turbine, beginning with the step of producing a first tower section. Steel sheet is bent substantially annularly and welded along a longitudinal edge to form a closed section piece. A plurality of section pieces, which are annular in cross-section, is welded along adjoining annular end faces, which run in the circumferential direction and are adjacent, to form a longitudinally extending tubular body, wherein, in order to form a tower section, a closed annular flange is in each case welded to the ring-shaped end faces of the tubular body and/or to a ring-shaped end face of a section part in a predetermined position with respect to the circumferential direction. At predetermined positions, the annular flange has a reduced cross section as the separating section, and the predetermined positions coincide with planned separation lines of the section segments or are aligned therewith. The separation section is arranged on the separation line.

In an advantageous embodiment of the invention, each section segment of a tower section includes one annular flange segment at the upper end face and at the lower end face, the arc length of the lower annular flange segment preferably being the same as, greater than or less than the arc length of the upper annular flange segment.

In an advantageous development of the invention, at least one annular flange is configured as a T-annular flange which includes a ring-shaped flange portion which has a multiplicity of through holes which are arranged on both sides of a central web of the T-annular flange in at least two concentric circles of holes. At least two, preferably three, predetermined positions, the cross section of the not yet divided T annular flange is reduced by two slots in each case in order to form the separation sections in the undivided state of the annular flange.

In a particularly preferred refinement, a first slot extends radially inward from the outer circumference of the ring-shaped flange portion and a second slot extends radially outward from the inner circumference of the ring-shaped flange portion, and therefore only a narrow, but sufficiently stiff segment connection as an extension of the web remains as the separation section.

In an advantageous development of the invention, at least one annular flange is configured as an L annular flange which includes a ring-shaped, horizontal flange portion which has a multiplicity of through holes which lie on a circle of holes, and a ring-shaped vertical flange portion, wherein, at at least two, preferably three, predetermined positions the cross section of the ring-shaped horizontal flange portion is reduced in the not yet divided state via a respective slot as a separation section. The horizontal flange portion can also be considered to be a web.

A preferred arrangement for the connecting of a first kind of longitudinal profile, especially in the form of a U, C, or cap profile, to the tubular wall of the tower section is accomplished in that the longitudinal profiles are welded on with a web facing the inner wall of a tower section. The number of parallel longitudinal profiles in a horizontal plane is equal to the number of section segments of a tower section.

When a C profile open toward the inside of the tower is used, in which two inwardly curved right-angled prolongations of the legs are facing each other and whose spacing basically corresponds to the width of the slot in the web, one has the further advantage that no spacing elements are needed, during a later installation of the section segments, since the mentioned prolongations are drawn toward each other via screw connections and thus perform the function of the spacing elements, thereby producing an advantageous reduction in the installation time at the installation site.

A preferred arrangement for the connecting of a second kind of longitudinal profile, especially in the form of H, I, or double T profiles, but also U, C, or cap profiles, to the tubular wall of the tower section, is accomplished in that the longitudinal profiles are welded on with their web facing the inner wall of a tower section. When using a longitudinal profile open toward the inside of the tower, in which the web is at a distance from the inner wall of a tower section, or from an H profile, the width of the slot in the web can advantageously be chosen such that no spacing elements are needed during a later installation of the section segments, since the end faces of the web are drawn toward each other and thus perform the function of the spacing elements, thereby producing an advantageous reduction in the installation time at the construction site.

It has been found to be advantageous for the length of the longitudinal profiles, relative to the longitudinal direction of the tower, in a section piece to be greater than the length of the section piece, as this bridges the horizontal welds for connecting the section pieces.

A tubular steel tower according to the invention affords time savings and economic savings for towers with a large diameter, and in addition wind turbines with the tubular steel towers according to the invention are available quickly for energy production. One further time-saving aspect when using section segments is that these can advisedly be provided with built-in elements, especially ones extending longitudinally, for example components for an access system, conductor sections and/or cable holding devices and/or busbars, before the section segments are transported to the installation site. A further benefit of the section segments is that these can be more easily surface coated and/or varnished, especially with smaller coating installations, before being transported to the installation site.

In an embodiment of the method, a longitudinal profile is welded on the tubular body or the tower section in each case along the planned separation line onto the inside of the tubular wall. During the severing of the tower section and of the annular flange/annular flanges, the longitudinal profile is severed at the same time and subsequently forms two legs, via which the severed section segments are joined to each other again. When connecting the section segments a spacer can be arranged between the legs. The longitudinal profile is welded onto the tower wall in such a manner that, after the severing, each leg is connected to its section segment.

In a method according to the invention, the tubular body is placed, via a hoist or an industrial truck, above at least one movable cutting device and set down on supporting means of a supporting device such that the first planned separation line is in the 6 o'clock position, that is, facing downward. According to the 6 and 12 o'clock positions on a watch dial, the 6 o'clock position denotes the lowest and the 12 o'clock position the highest position of the tubular body lying on the supporting means.

In one especially preferred procedure of the method, in a following step the annular flanges of the tower section are connected, in particular bolted, at the end face to a receiving wheel, the receiving wheels preferably being arranged in a rotatable manner on a supporting device in order to be rotated into a desired position. The tower section of the tubular body can be rotated in an especially gentle manner via the receiving wheels and the supporting device, that is, without leaving marks by rollers on the outer sheath of the tower wall, such as might occur with the use of roller beds.

In another especially preferred procedure of the method, the tubular body previously or subsequently the complete tower section is deposited via a hoist or an industrial truck onto the supporting device which has beams arranged parallel and spaced apart from one another, wherein the tubular body and/or the tower section is positioned in such a manner that a first planned separation line in the six o'clock position runs substantially centrally between the parallel and spaced-apart beams of the supporting device.

With another following step of the method, at least one movable cutting device with a cutting tool is moved into a starting position near a first annular flange and then in a further step the cutting tool, especially a side milling cutter or a saw blade, under rotation, is brought into engagement via a vertically movable tool holder with the first annular flange at the first predetermined position.

In one especially preferred procedure of the method, with a following step the first annular flange is severed using the cutting tool at the first predetermined position with reduced cross section and in a directly subsequent step the cutting tool is moved continuously along the first separation line through the tubular wall as well as the longitudinal profile connected to the tubular wall, wherein, preferably, on account of the chosen direction of rotation of the cutting tool, the resulting shavings are taken away downward. In a continuation of the movement, the cutting tool is further moved along the first axial separation line through the tubular wall as well as the longitudinal profile connected to it and the second annular flange at the other end of the tower section. After this, the cutting tool is moved back to the starting position, wherein preferably no engagement takes place. With a method according to the invention it is possible to automatically perform the cutting process over the entire length of the tower section, especially without a manual repositioning of a cutting device.

After producing the first lengthwise cut, the above-described steps are repeated in accordance with the number of lengthwise cuts planned, wherein between each two cuts rotation of the tower section about its longitudinal axis, for example, by 120°, is performed, preferably via the rotatable receiving wheels on the supporting device, so that the next planned separation line is positioned again at the 6 o'clock position.

When the required cuts are finally made, the cut section segments are held together by the receiving wheels arranged on the end sides. This is followed by releasing of the section segment from the receiving wheels, lifting of the section segment and setting it down on means of transport, hauling away of the section segment, preferably to a following processing installation, especially a coating and/or varnishing installation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
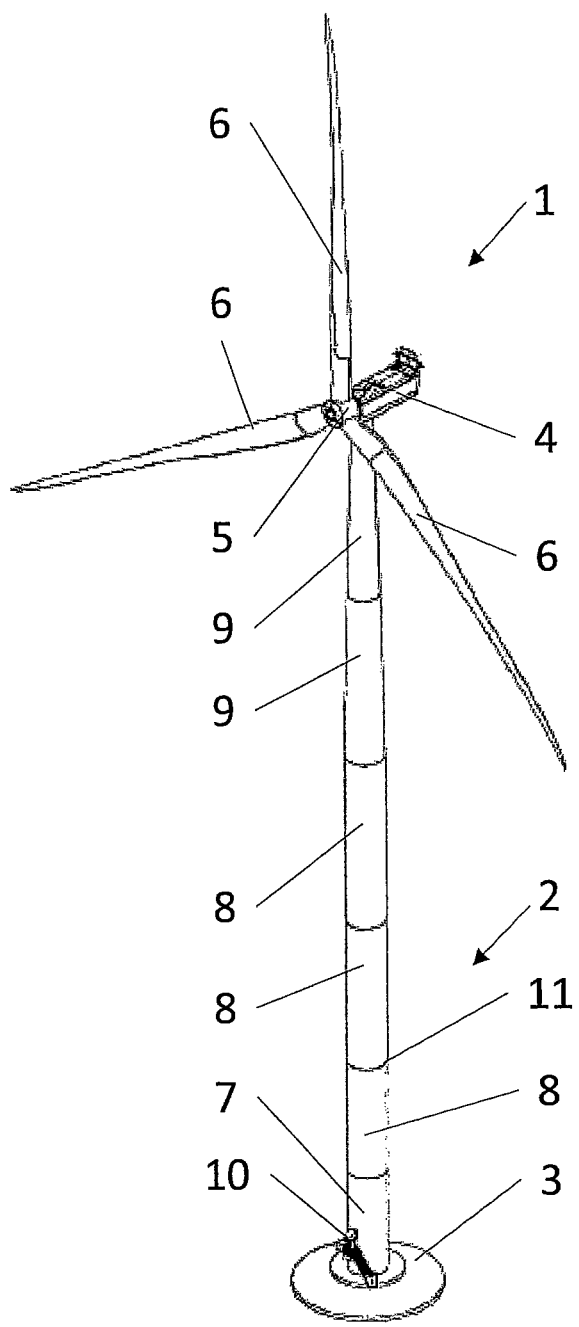
FIG. 1 shows an overall perspective view of a wind turbine.
Figure 2:
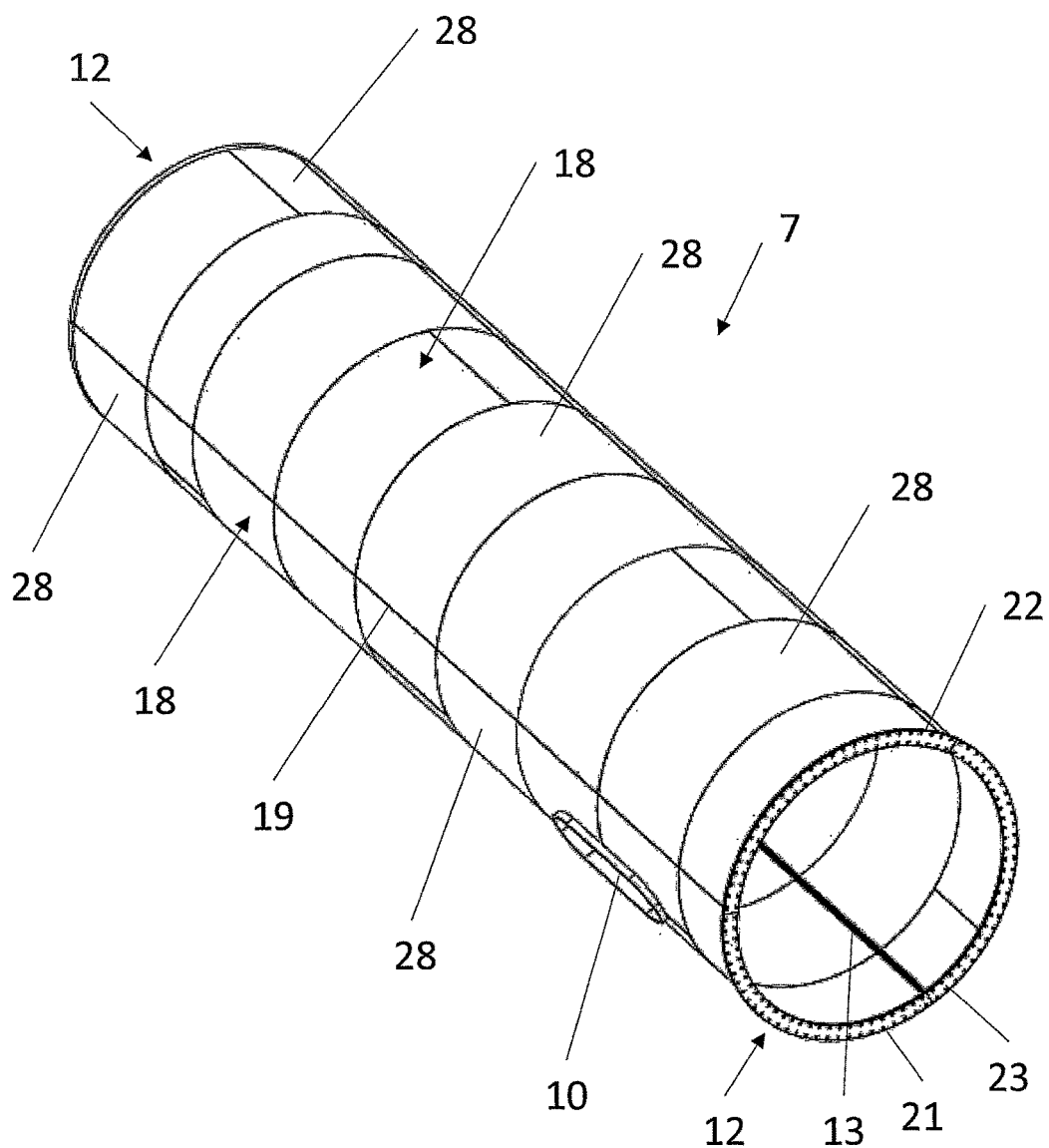
FIG. 2 shows a perspective view of a tower section.

FIG. 1 shows a wind turbine 1 with a tower, which is constructed as a tubular steel tower 2 from a number of equal and different tower sections 7, 8, 9, wherein the lowermost tower section 7 is shown in detail in FIG. 2. The tubular steel tower 2 carries a nacelle 4 which is mounted so as to be able to rotate about a vertical longitudinal axis of the tower. In the nacelle 4 is mounted a drive train (not shown) with a main shaft, a gearing, and a generator. The main shaft stands in operative connection with a rotor hub 5, on which three rotor blades 6 are mounted so as to be able to rotate about their longitudinal axis. The tubular steel tower 2 besides the lowermost tower section 7 includes further tower sections 8, 9, where the lower tower sections 7, 8, that is, those with larger diameter, include detachably joined section segments 18, while the upper tower sections 9, that is, those with smaller diameter, are configured as monolithic sections in the circumferential direction.

FIG. 2 shows the lower tower section 7 with the tower entrance door opening 10. The prefabricated tower section 7 includes a number of section pieces 28, also known as "rounds" or "cans" among experts. The section pieces 28 generally have a lengthwise welded seam due to the manufacturing process. Other tower sections 8, without tower entrance door opening 10, are constructed accordingly, the number of section pieces 28 possibly varying. In the sample embodiment shown, the tower section 7 has in total nine section pieces 28, which are welded to each other at their end faces. The free end faces of the outermost section pieces 28 of a section are each welded to an annular flange 12. In an advantageous modification, not shown, the annular flanges 12 are each welded beforehand to a perpendicularly disposed section piece 28 before this is welded to the other section pieces 28. It is known to weld individual annular flange segments, instead of closed annular flanges, to the free end faces of the outermost section pieces of a tower section, although this requires an additional effort for the orientation work.

As can furthermore be noticed in FIG. 2, the individual section pieces 28 can be rotated relative to each other about their lengthwise axis such that their longitudinal welded seams are always offset from each other by an offset angle so that the longitudinal welded seams of neighboring section pieces 28 do not lie flush in the same line. The sum of the offset angles is preferably 360° or a whole multiple thereof. FIG. 2 moreover shows a first longitudinal profile 13 roughly in the 5 o'clock position, which extends on the inside of the wall of the tower section 7 parallel to its center axis and is welded to the wall. Besides the longitudinal profile 13 shown, the tower section 7 has two more longitudinal profiles 13, not visible from the outside, each arranged at a 120° offset in the tubular wall. In a following fabrication step, the tower section 7 is divided along a first, second and third planned separation line 19 into three section segments 18, the planned separation lines 19 each coinciding with the longitudinal profiles 13. In other words, the respective lengthwise cutting occurs through the longitudinal profile 13, so that the section segments can afterwards be joined together once more by the longitudinal profile.

Figure 3A:
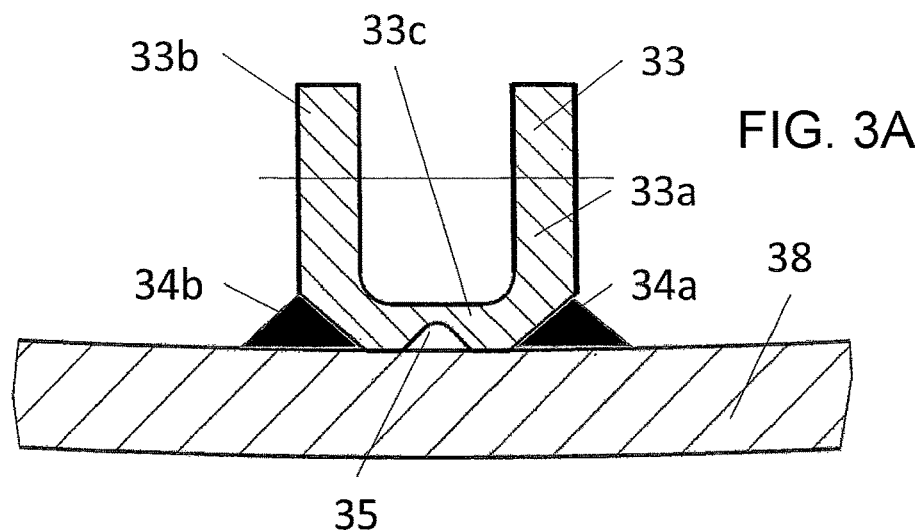
FIG. 3A shows a cross section view of a vertical longitudinal profile of a first embodiment in a first production phase.
Figure 3B:
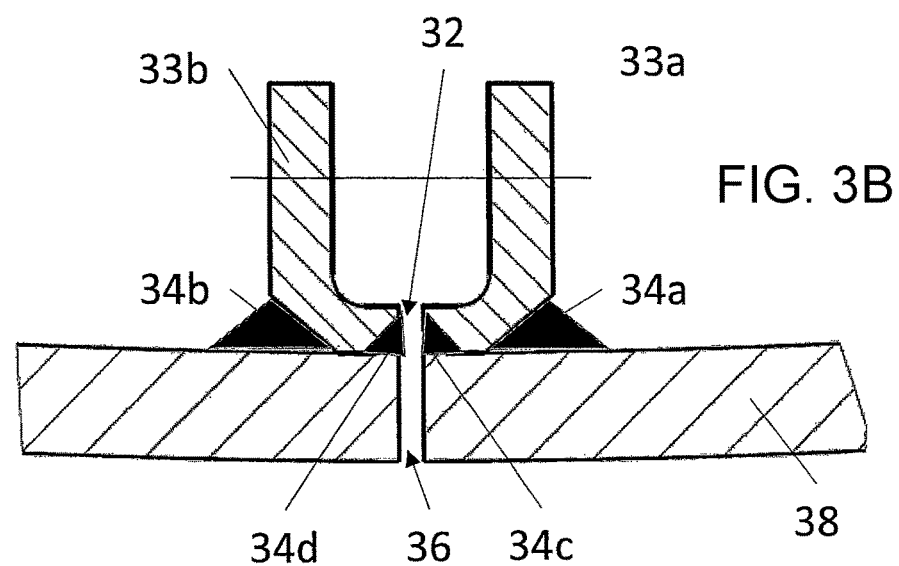
FIG. 3B shows a cross section view of the vertical longitudinal profile in FIG. 3A in a second production phase.
Figure 3C:
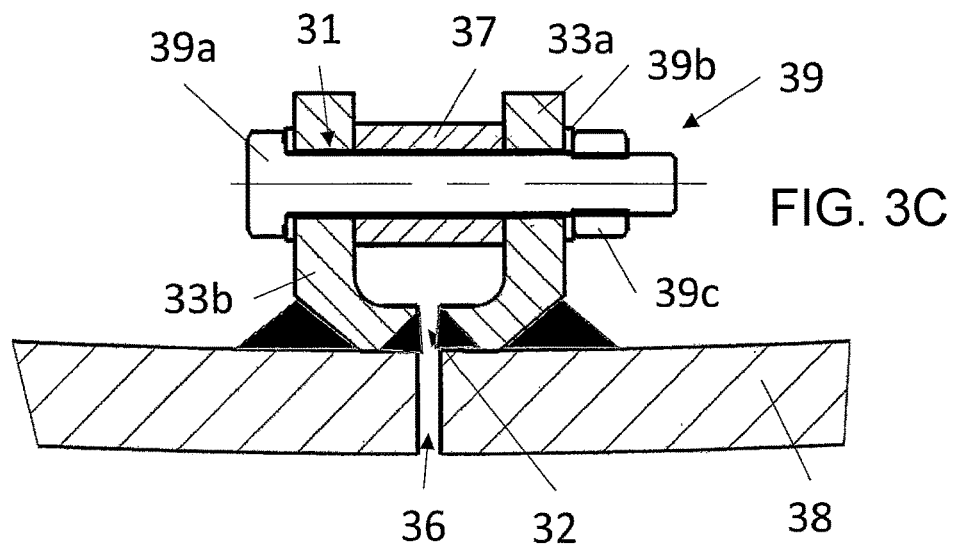
FIG. 3C shows a cross section view of the vertical longitudinal profile in FIG. 3A in a third production phase.

FIGS. 3A, 3B and 3C show one possible longitudinal profile 13 in the form of a U profile 33, having equally long, plane parallel legs 33a, 33b and a web 33c joining the legs together, in three consecutive fabrication steps. The U profile 33 at first is welded by its web 33c on either side by the welded seams 34a and 34b to the as yet undivided tubular wall 38, only one cutout of the tubular wall 38 being shown. The web 33c furthermore has on the side facing the tubular wall 38 a fillet 35, which has two purposes: first of all, an advantageous cross section and thus material reduction is achieved for a following lengthwise cutting, wherein a first slot 36 is created in the tubular wall 38 of the tower section 7, 8 and a second slot 32 in the web 33c of the U profile 33, cf. FIG. 3B. The slots 36 and 32 are preferably produced in a common separation process. Each of the slots 32, 36 after the severing has a pair of mutually facing separation sections in which the separation occurred. Secondly, a fillet is created on either side of the slot edge for a further welded seam 34c, 34d on each side. In the course of the installation at the construction site, the section segments 18 are finally connected securely via connection means 39, especially threaded bolts 39a, which are passed through holes 31 in the legs 33a, 33b of the severed longitudinal profile, and nuts 39c. Spacing elements 37 ensure a predetermined spacing and the slot widths 32, 36, as shown by FIG. 3C. Thus, a desired slot width 32, 36 can be advantageously adjusted with the length of the spacing elements 37.

Figure 4A:
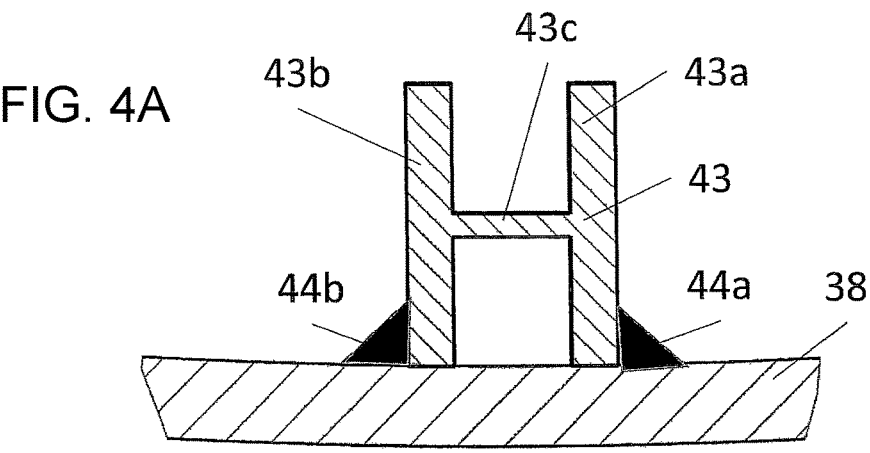
FIG. 4A shows a cross section view of a vertical longitudinal profile of a second embodiment in a first production phase.
Figure 4B:
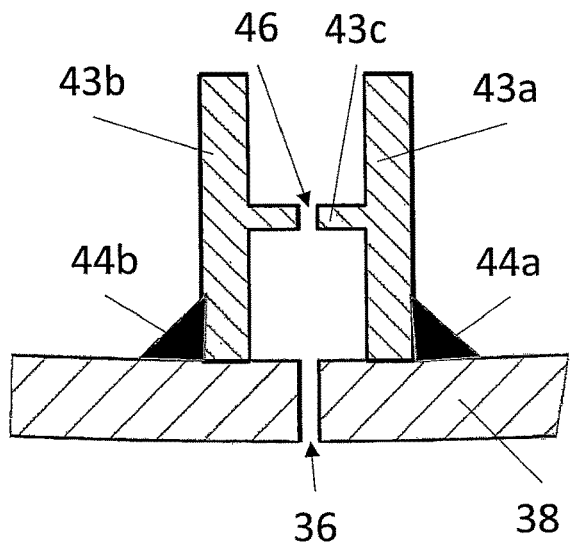
FIG. 4B shows a cross section view of a vertical longitudinal profile in FIG. 4A in a second production phase.
Figure 4C:
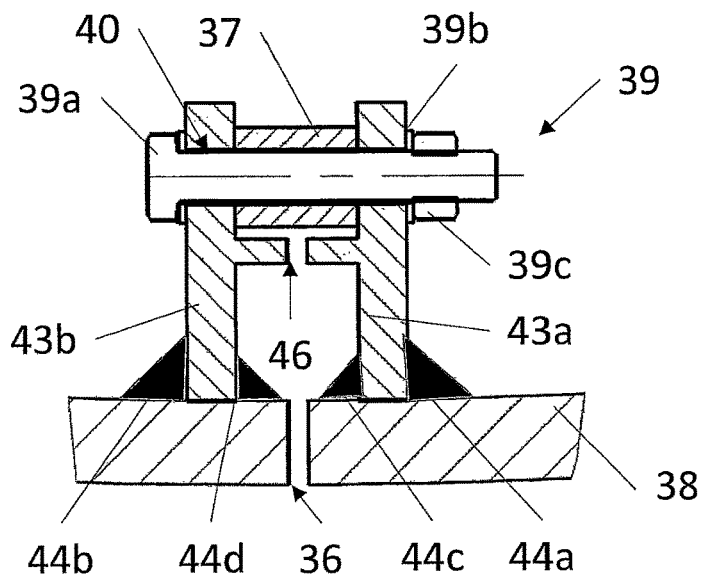
FIG. 4C shows a cross section view of a vertical longitudinal profile in FIG. 4A in a third production phase.

FIGS. 4A, 4B and 4C show another arrangement of longitudinal profile 13 and tubular wall 38. The longitudinal profile 13 here is fashioned in the form of an H profile 43, having equally long and plane parallel legs 43a, 43b and a web 43c. The H profile 43 is at first welded by its legs 43a, 43b on either side by the welded seams 44a and 44b to the as yet undivided tubular wall 38. FIG. 4B shows the arrangement having the longitudinal profile 13 and the tubular wall 38 after a lengthwise cut has been made, wherein a first slot 36 was created in the tubular wall 38 of the tower section 7, 8 and a second slot 46 in the web 43c of the H profile 43. FIG. 4C finally shows the threaded bolts 39a, nuts 39c and spacing elements 37 led through holes 40 of the legs 43a, 43b in the course of the installation at the construction site and the thus securely connected section segments 18, once again only showing a cutout of the tubular wall 38.

Figure 5:
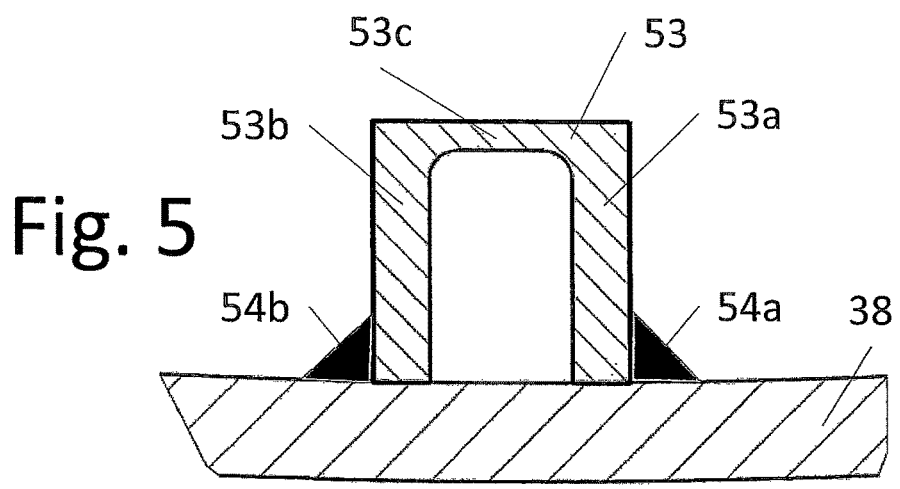
FIG. 5 shows a cross section view of a vertical longitudinal profile in a third embodiment.

FIG. 5 shows a longitudinal profile 13 in the form of another U profile 53, but one which has been rotated about its longitudinal axis by 180° as compared to the arrangement in FIGS. 3A, 3B and 3C. The U profile 53 contrary to the sample embodiment of FIGS. 3A, 3B and 3C has been welded by the legs 53a, 53b via the welded seams 54a and 54b to the as yet undivided tubular wall 38. The further fabrication steps are essentially as represented and described in FIGS. 4B and 4C.

Another advantageous arrangement, not shown, has in place of a U profile 33 per FIGS. 3A, 3B and 3C, a C profile open on top. The C profile by contrast with the U profile 33 has two inwardly curved right-angle prolongations of the legs, the open end surfaces of these prolongations facing each other and their spacing corresponding substantially to the width of the slot in the web. The C profile has the further advantage that the spacing elements 37 are not needed during a later installation of the section segments 18, since the mentioned prolongations are drawn toward each other and thus take on the function of the spacing elements 37, achieving an advantageous reduction in the installation time.

Figure 15A:
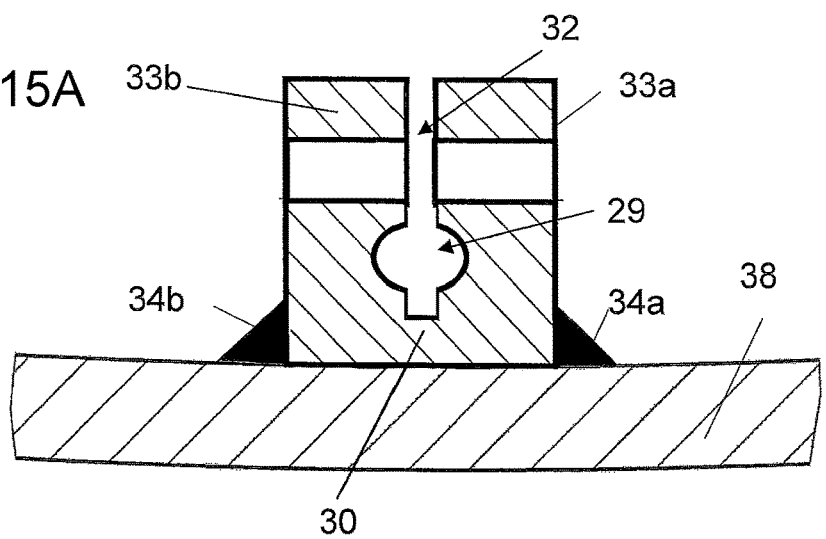
FIGS. 15A to 15C show a cross section view of a vertical longitudinal profile in an embodiment with no web in three different production phases.
Figure 15B:
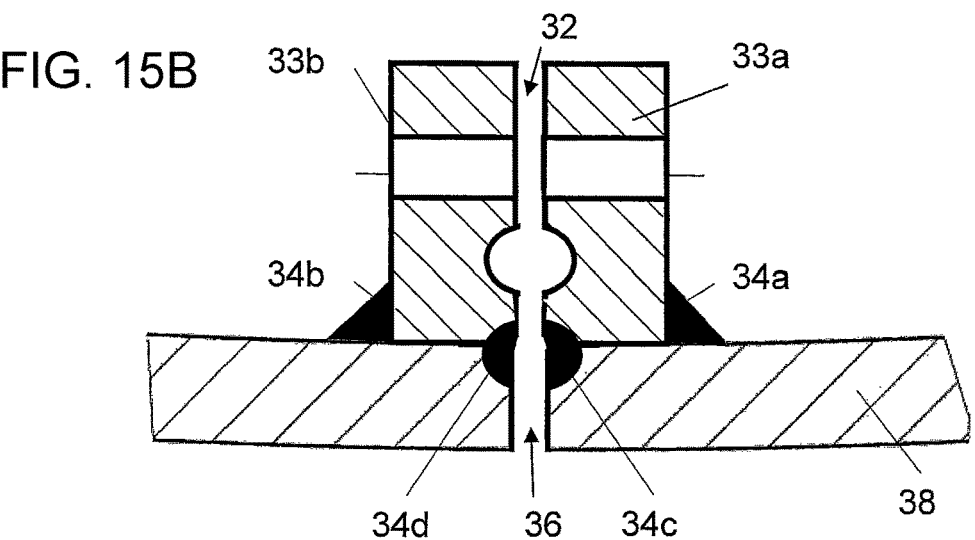
Figure 15C:
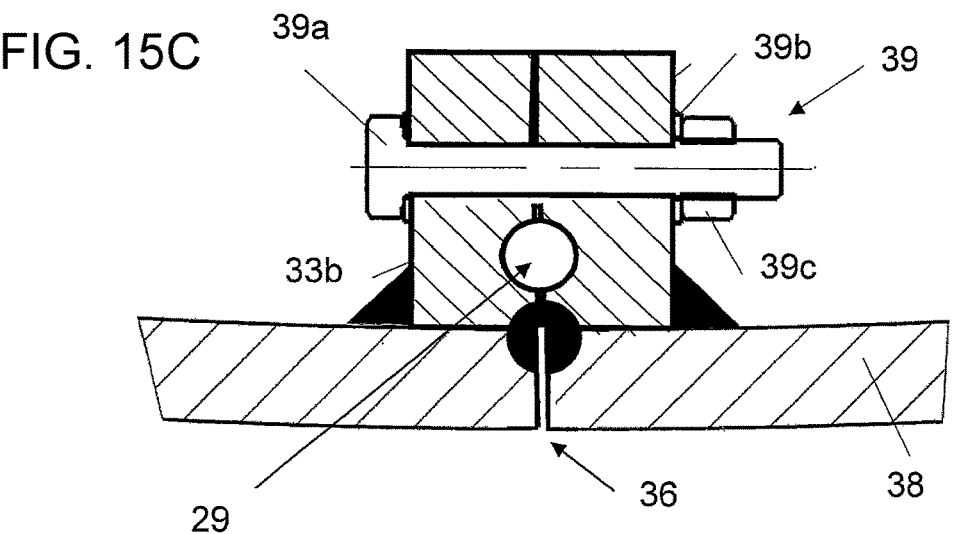

Besides the above profiles of FIGS. 3, 4 and 5, having a web which joins the legs together, FIGS. 15A, 15B and 15C show a longitudinal profile 30 which is welded by two lateral welded seams 34a, 34b to the tubular wall. The longitudinal profile 30 has two legs 33a, 33b, which are separated from each other by a groove 32. The groove 32 has a groove bottom in the longitudinal profile 30. In the groove there is provided a borehole 29, which extends in the longitudinal direction of the longitudinal profile 30. Upon severing the tubular wall 38 in the region 36, the groove bottom is also severed and the two legs 33a, 33b are independent of each other. Since the width of the separating slot in the region 36 is larger than the groove width 32, the legs remain behind without web sections. Instead, these have separation sections on the mutually facing sides of the legs, which are formed by the severing of the tower wall and the longitudinal profile. The legs 33a, 33b are connected by welding at their mutually facing sides to the tower wall 38. If the severed section segments are supposed to be joined together once more with the aid of the severed longitudinal profile 30, an orientation can be done by a centering pin in the borehole 29. Thanks to the centering pin, the legs 33a, 33b are oriented relative to each other and can thus be fastened to each other by the threaded bolt 39a, the washer 39b and the nut 39c.

Figure 6:
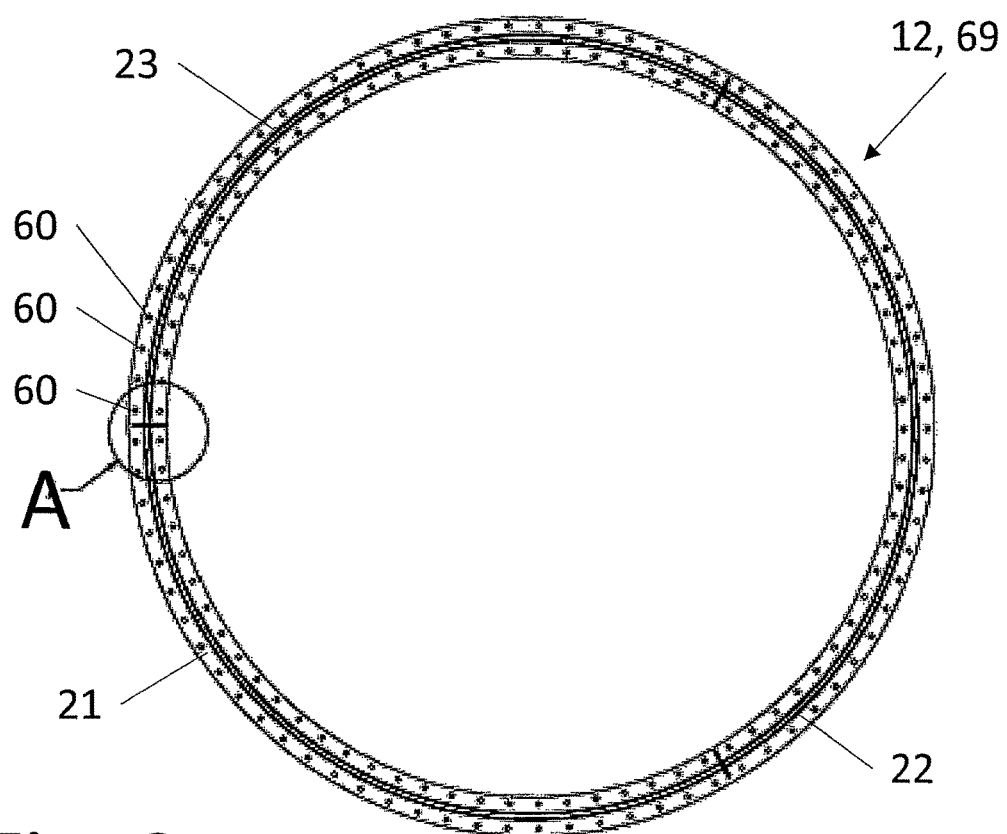
FIG. 6 shows a top view of a T-annular flange.
Figure 7:
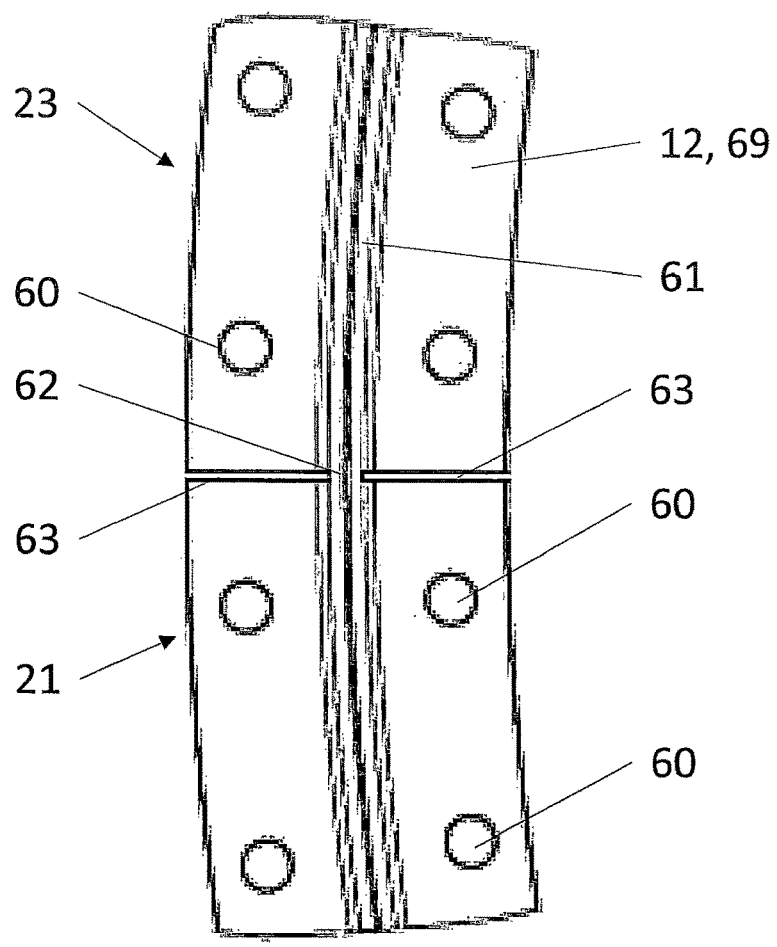
FIG. 7 shows a magnified cutout of the T-annular flange of FIG. 6.
Figure 8:
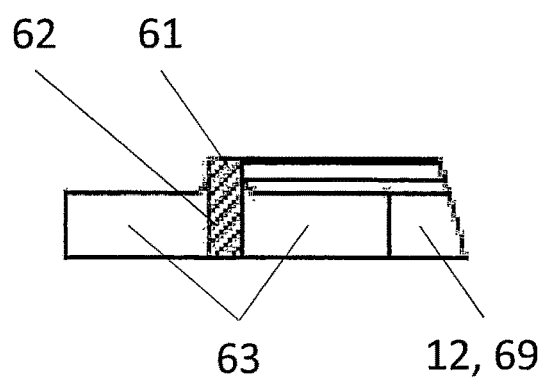
FIG. 8 shows a cross section view of the T-annular flange of FIG. 6.

FIG. 6 shows a top view of an annular flange 12 with an indicated detail "A". FIG. 7 shows an enlarged cutout and FIG. 8 a cross section view of detail "A". The annular flange per FIGS. 6, 7 and 8 is configured as a T-annular flange 69, which is intended to attach the lowermost tower section 7 to the foundation 3 and its projecting anchor bolts (not shown). The T-annular flange 69 has separation sections with reduced material thickness at predetermined positions, where the annular flange can be divided into three annular flange segments 21, 22, 23. At each predetermined position of a separation section, the cross section of the T-annular flange 69 is reduced by two slots 63, so that only a narrow segment connection 62 remains. This segment connection 62 will be severed later in the fabrication process, namely, only after the welding of the T-annular flange 69 to a section piece 28 of the tower section 7. Furthermore, the T-annular flange 69 has a plurality of through holes 60, which are arranged on either side of the web 61 in two concentric circles of holes.

Figure 9:
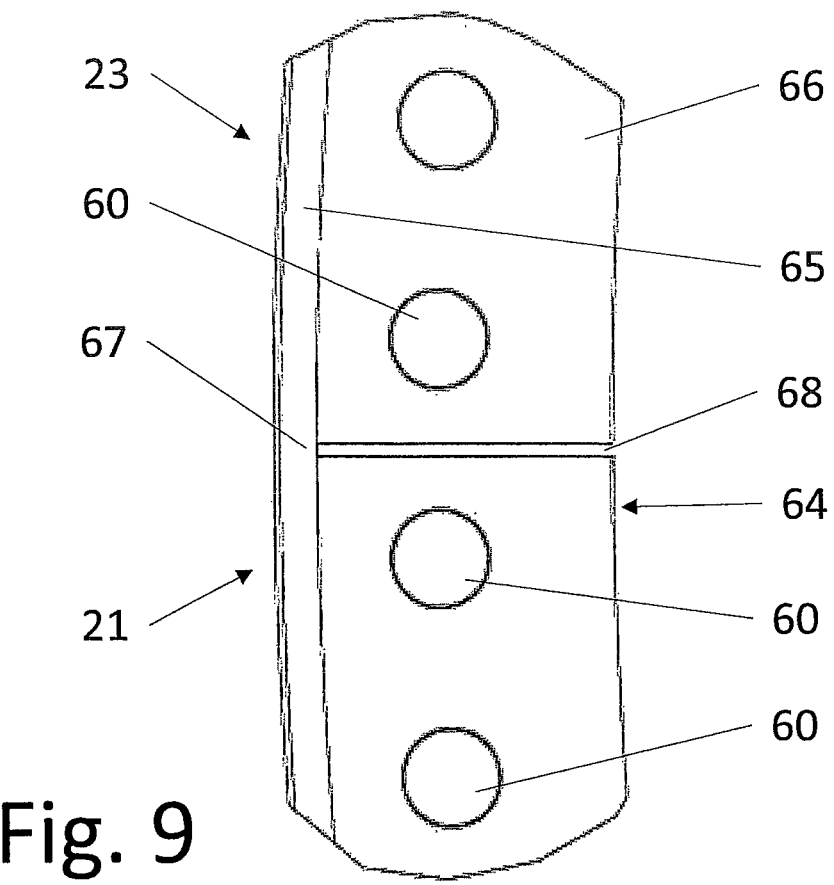
FIG. 9 shows a magnified cutout of an L-annular flange.
Figure 10:
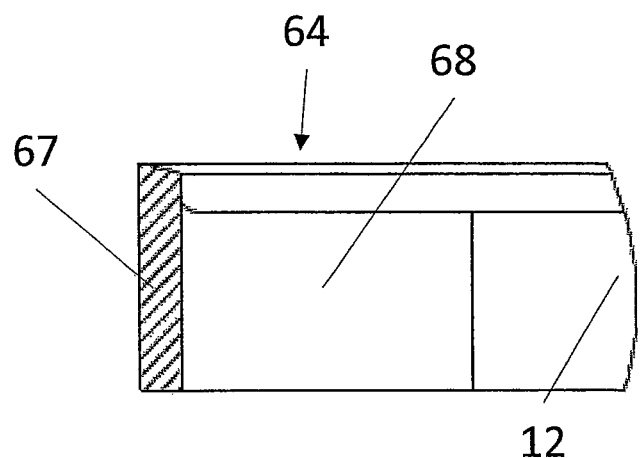
FIG. 10 shows a cross section view of the L-annular flange of FIG. 9.

For the connecting of the tower sections 7, 8, 9 to each other, annular flanges 12 are provided in the form of L-annular flanges 64, having two legs 65, 66 arranged at right angles to each other, as shown in FIGS. 9 and 10. The first leg 65, pointing out from the plane of the drawing in FIG. 9, is butt welded to a section piece 28 of the tower section 7, 8 and thus forms a section of the outer shell of the tower section 7, 8. The second leg 66, directed inward in the plane of the drawing, has a plurality of through holes 60 for connection means 39, in order to connect the L-annular flange 64 to the adjoining L-annular flange 64 of an adjoining tower section 7, 8. Thus, the two L-annular flanges 64 form a pair of annular flanges. As can be seen again in FIGS. 9 and 10, the L-annular flange 64 is provided with separation sections at predetermined positions, where the annular flange can be divided into three annular flange segments 21, 22, 23. At the predetermined position of the separation sections the cross section of the L-annular flange 64 is reduced by a slot 68, so that a narrow segment connection 67 exists. This segment connection 67 will be severed later in the fabrication process after the welding of the L-annular flange 64 to a section piece 28. The segment connection 67 forms the separation section for the L-annular flange 64.

The choice of the connection means 39 is not limited to threaded bolts 39a, washers 39b and nuts 39c, but rather many other connection means are likewise suitable, especially screw connections such as threaded rods with nuts provided on both sides, threaded sleeves with threaded bolts provided at both sides, et cetera.

Figure 11:
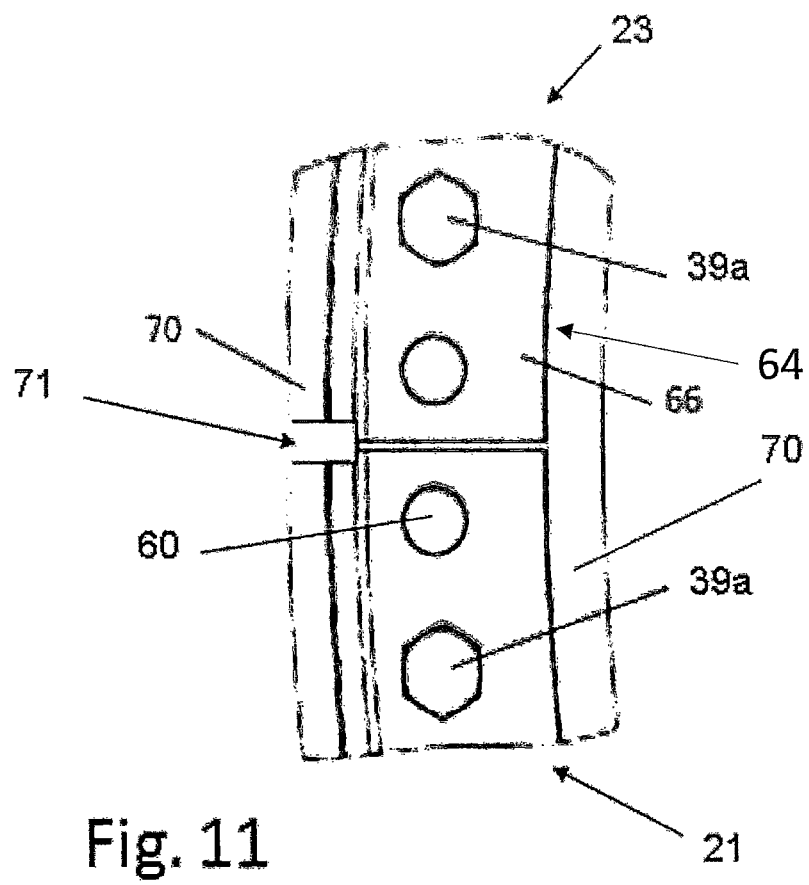
FIG. 11 shows a magnified cutout of an L-annular flange and an adapter plate.
Figure 12:
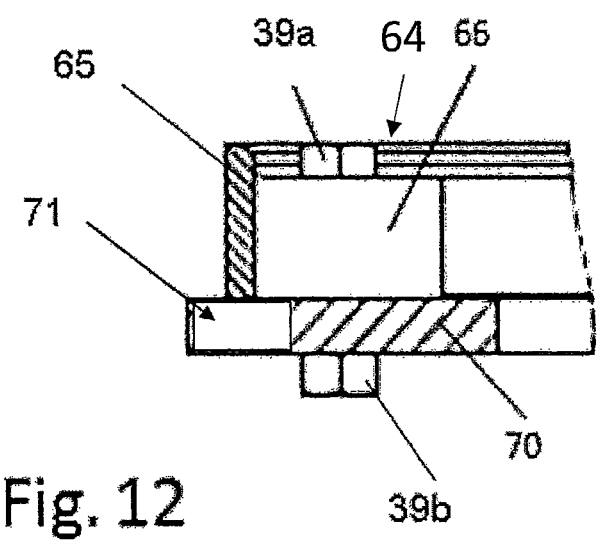
FIG. 12 shows a cross section view of the L-annular flange and the adapter plate of FIG. 11.

FIG. 11 shows a top view and FIG. 12 a cross section view of a cutout of an adapter plate 70 mounted on an L-annular flange 64 of a tower section, serving for the connecting or supporting of the tower section during a further processing and especially during a severing of the tower section. The L-annular flange 64 is connected to the adapter plate 70 by a screw connection including threaded bolts 39a and nuts 39c. The adapter plate 70 has a one-sided slot 71 for the passage of a cutting tool 99. After a severing of the segment connection 67 in the separation section, the annular flange segments 21, 22, 23 remain connected with the adapter plate 70 and are thus fixed in their position.

Figure 13:
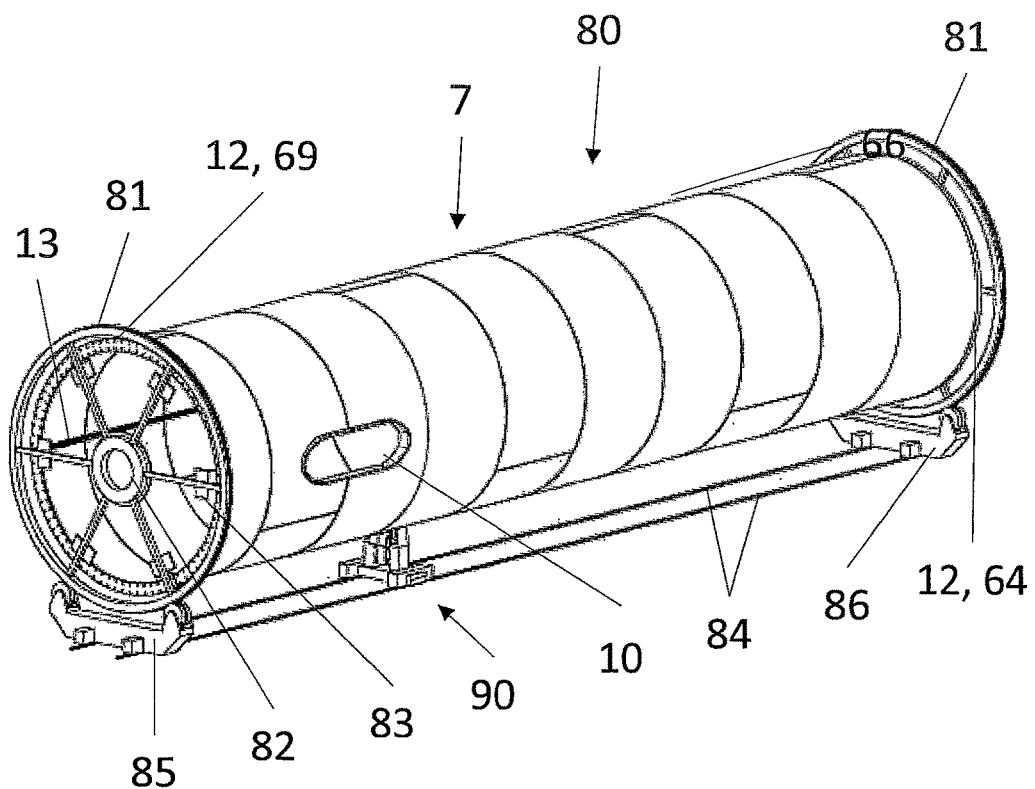
FIG. 13 shows an overall perspective view of a tower section in a machining station.

FIG. 13 shows an overall perspective view of a tower section 7 in a supporting device 80 for the lengthwise cutting of tower sections in their 6 o'clock position. The supporting device 80 includes two rotatable receiving wheels 81, which are supported by roller bearings 85, 86 running on rails 84, wherein the rollers of the roller bearings 85, 86 could be driven via electric motors. The rotatable receiving wheels 81 are each connected to an annular flange 12 at the end faces of the tower section 7, 8 directly or via an adapter plate 70. The receiving wheels 81 have a wheel hub 82, which is connected by spokes 83 to an outer ring. In one modification, not shown, the receiving wheels 81 may be rotatably mounted in the wheel hub 82 via mandrels instead of roller bearings 85, 86. A cutting device 90 which can move via a feeding drive is arranged on the rails 84, with the travel of the cutting device 90 extending over the entire length of a tower section.

Figure 14:
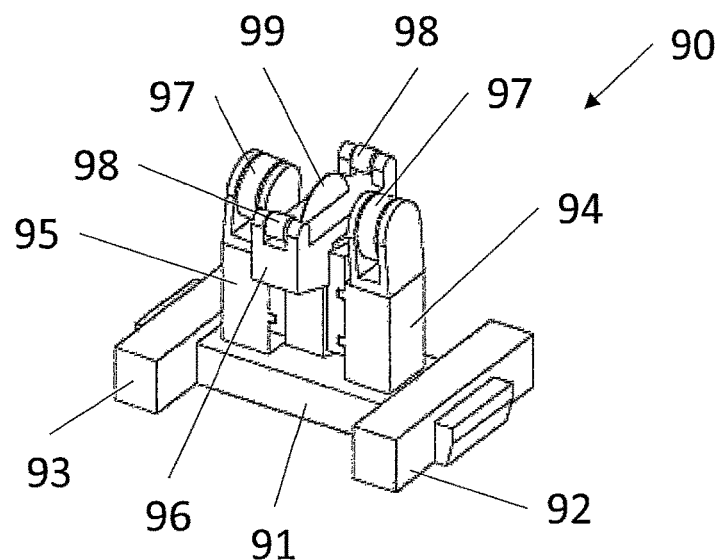
FIG. 14 shows a perspective view of a cutting device.

FIG. 14 shows a perspective view of the cutting device 90 for the lengthwise cutting of tower sections 7, 8 in the 6 o'clock position. The cutting device 90 includes a cutting tool 99, preferably configured as a side milling cutter or a saw blade. The cutting tool 99 is rotatably mounted in a vertically adjustable tool holder 96. The tool holder 96 furthermore includes guide rollers 98. On both sides of the cutting tool 99 and the tool holder 96 there are provided support rollers 97 along with support roller lifting devices 94, 95, which ensure a constant cutting depth of the cutting tool 99 in the material, especially in the tubular wall 38 of a tower section 7, 8. The tool holder 96 and the support roller lifting devices 94, 95 are held on a cross beam 91, which connects two driving frames 92, 93 for two feeding drives, not shown. The feeding drives actuate in synchronism the driving wheels which are guided on the rails 84.

One sample embodiment not shown has separate height-adjustable punches for lifting the tower section mounted in the supporting device in order to compensate for a buckling resulting from the force of gravity of the tower section mounted between its bearing points. In order to position the punches optimally in height—in the sense of a straight cutting line—at least one optical sensor is provided, which is connected to a control circuit for controlling the punch height. The cutting device 90 is mounted and guided movably on rails via at least one feeding drive. Thanks to the punches which are independent of the cutting device 90, the loading on the cutting device is considerably reduced, especially thanks to the force of gravity not needing to be supported. The cutting device according to this second sample embodiment can be more simple in configuration than the cutting device 90 in the sample embodiment of FIG. 13 and FIG. 14 on account of the functional separation; in particular, the support rollers 97 plus the support roller lifting devices 94, 95 shown there can be eliminated. Another advantage is that the feeding drives of the cutting device 90 only need to provide a power corresponding to the feeding/cutting force.

Another especially advantageous supporting device, not shown, has two spaced apart, horizontally arranged girders as a bearing bed for a tower section 7, 8 being machined, having slanting or concave receiving portions arranged in pairs. The spacing of the girders is larger than the greatest width of the cutting device, so that it can move freely on the rails beneath the tower section, the rails being preferably laid in a channel in the floor as a kind of subfloor. The cutting device can be driven by at least one feeding drive. This cutting device in turn can be more simple in configuration than the cutting device 90 of the sample embodiment in FIGS. 13 and 14; in particular, the support rollers 97 plus the support roller lifting devices 94, 95 shown there can be eliminated. Another advantage is that the feeding drives of the cutting device 90 only need to be configured for a power corresponding to the feeding/cutting force, since they do not need to overcome any supporting load component.

It is understood that the foregoing description is that of the preferred embodiments of the invention and that various changes and modifications may be made thereto without departing from the spirit and scope of the invention as defined in the appended claims.

LIST OF REFERENCE SYMBOLS

1 Wind turbine
2 Tubular steel tower
3 Foundation
4 Nacelle
5 Rotor hub
6 Rotor blade
7, 8, 9 Tower section
10 Tower entrance door opening
11 Section separation
12 Annular flange
13 Longitudinal profile
18 Section segment
19 Separation line 21, 22, 23 Annular flange segment
28 Section piece
29 Borehole
31 Borehole
32, 36 Slot
33, 53 U-profile
33a, 33b Leg
33c, 53c Web
34a, 34b, 54a, 54b Welded seam
34c, 34d Welded seam
35 Fillet
37 Spacing element
38 Tubular wall
39 Connection means
39a Threaded bolt
39b Washer
39c Nut
40, 60 Through borehole
43 H-profile
43a, 43b Leg
43c Web
44a, 44b, 44c, 44d Welded seam
46 Slot
61 Web
62, 67 Segment connection
63, 68 Slot
64 L-annular flange
65, 66 Leg
69 T-annular flange
70 Adapter plate
80 Machining station
81 Receiving wheel
82 Wheel hub
83 Spoke
84 Rail
85, 86 Roller bearing
90 Separating device
91 Cross beam
92, 93 Driving frame
94, 95 Support roller lifting device
96 Tool holder
97 Support roller
98 Guide roller
99 Cutting tool

What is claimed is:

1. A steel tower for a wind turbine, the steel tower defining a longitudinal tower direction, the steel tower comprising:
   a plurality of annular flanges configured to run horizontally;
   a plurality of tower sections arranged one above another and joined together via said annular flanges;
   each of said tower sections being either conical or cylindrical;
   at least one of said tower sections including at least two section pieces;
   said at least two section pieces being welded together along their adjacent, horizontal and annular end faces and being welded in each case to one of said horizontal annular flanges along a free uppermost and a lowermost end face;
   said at least one tower section being divided into a plurality of section segments which are joined together by longitudinal profiles and connectors so as to form an encircling tower section;
   at least one of said annular flanges having at least two separation areas in which said annular flange is divided into annular flange segments;
   said at least one of said annular flanges being configured to form a monolithic annular flange prior to a severing of the section segments;
   at least one of said annular flanges is configured as a T-annular flange which includes an annular web and annular flange portions which protrude from both sides of said annular web;
   said annular flange portions protrude on both sides of said annular web and have a plurality of through holes arranged in concentric circles of holes;
   said annular flange portions, in an undivided state, are each reduced in at least two positions in their cross section by a first slot and a second slot so as to form said separation areas;
   said annular flange portions each define an outer circumference and an inner circumference; and,
   said first slot extends radially inwardly from an outer circumference of said annular flange portion corresponding thereto and said second slot extends radially outwardly from an inner circumference of said annular flange portion corresponding thereto so as to cause only a segment connection as an extension of said annular web to remain.

2. The steel tower of claim 1, wherein:
   each of said section segments of one of said tower sections having an upper end face and a lower end face; and,
   each of said section segments of one of said tower sections having at least one of said annular flange segments at each upper end face and lower end face corresponding thereto.

3. The steel tower of claim 1, wherein:
   the steel tower defines a tower wall;
   said longitudinal profiles each have two legs running parallel to each other; and,
   each of said longitudinal profiles is connected to a web.

4. The steel tower of claim 1, wherein:
   the steel tower defines a tower wall;
   said longitudinal profiles each have two legs running parallel to each other;
   each of said longitudinal profiles is connected to a web; and,
   at least one of said legs and said web are welded onto an inner wall of said tower section.

5. A steel tower for a wind turbine, the steel tower defining a longitudinal tower direction, the steel tower comprising:
   a plurality of annular flanges configured to run horizontally;
   a plurality of tower sections arranged one above another and joined together via said annular flanges;
   each of said tower sections being either conical or cylindrical;
   at least one of said tower sections including at least two section pieces;
   said at least two section pieces being welded together along their adjacent, horizontal and annular end faces and being welded in each case to one of said horizontal annular flanges along a free uppermost and a lowermost end face;
   said at least one tower section being divided into a plurality of section segments which are joined together by longitudinal profiles and connectors so as to form an encircling tower section;
   at least one of said annular flanges having at least two separation areas in which said annular flange is divided into annular flange segments;

said at least one of said annular flanges being configured to form a monolithic annular flange prior to a severing of the section segments;

at least one of said annular flanges is configured as an L-annular flange which includes an annular horizontal flange portion which defines a multiplicity of through holes disposed on a circle of holes and includes an annular vertical flange portion, wherein, in the non-divided state, in at least two positions a cross section of said horizontal flange portion is reduced in each case by a slot so as to form said separation areas;

said annular flange portion defines an inner circumference; and, said slot extends radially outwardly from said inner circumference of said annular horizontal flange portion corresponding thereto so as to cause only a segment connection as an extension of said annular vertical flange portion to remain.

6. The steel tower of claim 5, wherein:
each of said section segments of one of said tower sections has an upper end face and a lower end face; and,
each of said section segments of one of said tower sections has at least one of said annular flange segments at each upper end face and lower end face corresponding thereto.

7. The steel tower of claim 5, wherein:
the steel tower defines a tower wall;
said longitudinal profiles each have two legs running parallel to each other; and,
each of said longitudinal profiles is connected to a web.

8. The steel tower of claim 5, wherein:
the steel tower defines a tower wall;
said longitudinal profiles each have two legs running parallel to each other;
each of said longitudinal profiles is connected to a web; and,
at least one of said legs and said web are welded onto an inner wall of said tower section.

9. A method for making a steel tower for a wind turbine, the method comprising the steps of:
making a section segment for a tower section, wherein first of all a steel sheet is bent annularly and is welded along a longitudinal edge to form a closed section segment;
welding a plurality of section segments along their end faces running in the circumferential direction to form a tubular body;
aligning a circumferential annular flange on at least one of a section segment, which is not yet welded to the tubular body, and one of the end faces of the tubular body;
welding on the aligned annular flange so as to form the tower section, wherein the annular flange has, at predetermined positions, a separation area in each case with a reduced cross section, and the separation areas each coincide with a planned separation line, wherein said annular flange is configured as a T-annular flange including an annular web and annular flange portions which protrude from both sides of the annular web, the annular flange portions protrude on both sides of the annular web and have a plurality of through holes arranged in concentric circles of holes, the annular flange portions—in an undivided state—are each reduced in at least two positions in their cross section by a first slot and a second slot so as to form the separation areas, the annular flange portions each define an outer circumference and an inner circumference, the first slot extends radially inwardly from the outer circumference of the annular horizontal flange portion corresponding thereto and the second slot extends from the inner circumference of the annular flange portion corresponding thereto so as to cause only a segment connection as an extension of said annular web to remain; and,
severing the tower section including the annular flange along the separation line into section segments and subsequently connecting the severed section segments to form the tower section of the steel tower.

10. The method of claim 9 further comprising the step of:
welding a respective longitudinal profile on at least one of the tubular body and the section segment along each of the planned separation lines onto the inside of the tube wall, wherein weld seams are provided on both sides of each longitudinal profile, and the planned separation line runs between the weld seams.

11. A method for making a steel tower for a wind turbine, the method comprising the steps of:
making a section segment for a tower section, wherein first of all a steel sheet is bent annularly and is welded along a longitudinal edge to form a closed section segment;
welding a plurality of section segments along their end faces running in the circumferential direction to form a tubular body;
aligning a circumferential annular flange on at least one of a section segment, which is not yet welded to the tubular body, and one of the end faces of the tubular body;
welding on the aligned annular flange so as to form the tower section, wherein the annular flange has, at predetermined positions, a separation area in each case with a reduced cross section, and the separation areas each coincide with a planned separation line;
welding a respective longitudinal profile on at least one of the tubular body and the section segment along each of the planned separation lines onto the inside of the tube wall, wherein weld seams are provided on both sides of each longitudinal profile, and the planned separation line runs between the weld seams; and,
severing the tower section including the annular flange along the separation line into section segments and subsequently connecting the severed section segments to form the tower section of the steel tower;
wherein the tubular body is placed above at least one movable cutting device and set down on a supporting device such that a first planned separation line is positioned in a six o'clock position via a hoist or an industrial truck.

12. The method as claimed in claim 11 further comprising the step of connecting each annular flange of the tower section at the end face to a receiving wheel in order to be rotated on the supporting device into the desired position.

13. The method of claim 11, wherein the supporting device has beams running in parallel and spaced apart, with at least one of the tubular body and the tower section being positioned on the supporting device in such a manner that the first separation line runs between the beams in the six o'clock position.

14. The method of claim 11, wherein at least one movable cutting device with a cutting tool is moved into a starting position near a first annular flange and then the cutting tool is brought into engagement via a vertically movable tool holder with the first annular flange at the first predetermined position.

15. The method of claim 14, wherein the first annular flange is severed via the cutting tool at a first predetermined position with reduced cross section and thereafter the tubular wall is severed along the first separation line.

16. The method of claim 15 further comprising the step of rotating the tower section by a predetermined angular amount about its longitudinal axis such that a planned second separation line is positioned in the six o'clock position.

17. The method of claim 16 further comprising the step of severing the first angular flange at a second separation area and the tube wall along the second separation line.

18. A method for making a steel tower for a wind turbine, the method comprising the steps of:
   making a section segment for a tower section, wherein first of all a steel sheet is bent annularly and is welded along a longitudinal edge to form a closed section segment;
   welding a plurality of section segments along their end faces running in the circumferential direction to form a tubular body;
   aligning a circumferential annular flange on at least one of a section segment, which is not yet welded to the tubular body, and one of the end faces of the tubular body;
   welding on the aligned annular flange so as to form the tower section, wherein the annular flange has, at predetermined positions, a separation area in each case with a reduced cross section, and the separation areas each coincide with a planned separation line, wherein the annular flange is configured as an L-annular flange which includes an annular horizontal flange portion defining a multiplicity of through holes disposed on a circle of holes and further includes an annular vertical flange portion, wherein—in the non-divided state—in at least two positions a cross section of the horizontal flange portion is reduced in each case by a slot so as to form a separation area, the horizontal annular flange portion defines an inner circumference, and, the slot extends radially outwardly from the inner circumference of the annular horizontal flange portion corresponding thereto so as to cause only a segment connection as an extension of the annular vertical flange portion to remain; and,
   severing the tower section including the annular flange along the separation line into section segments and subsequently connecting the severed section segments to form the tower section of the steel tower.

19. The method of claim 18 further comprising the step of:
   prior to said severing the tower section, welding a respective longitudinal profile on at least one of the tubular body and the section segment along each of the planned separation lines onto the inside of the tube wall, wherein weld seams are provided on both sides of each longitudinal profile, and the planned separation line runs between the weld seams.

* * * * *